United States Patent Office 3,544,823
Patented Dec. 1, 1970

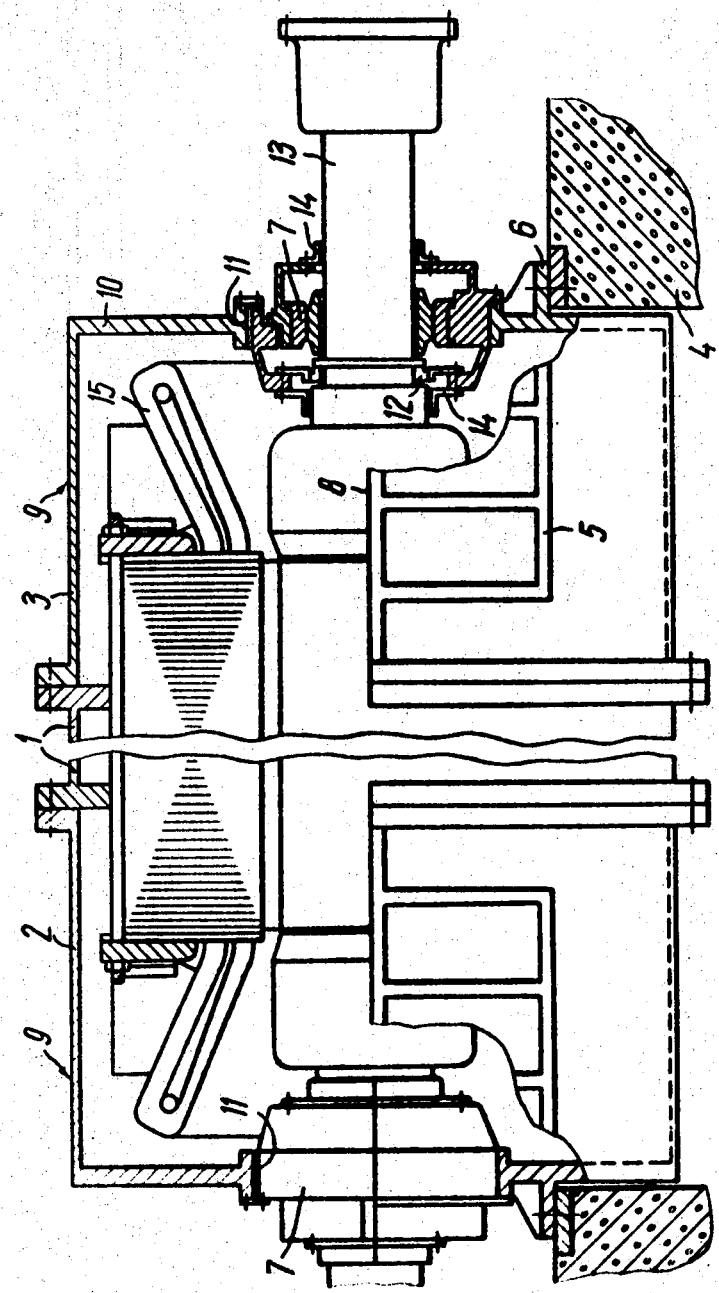

3,544,823
HIGH POWER ELECTRICAL MACHINE SUCH AS A TURBOGENERATOR
Alexandr Abramovich Chigirinsky, Ulitsa Kuibysheva 11, kv. 8; Boris Volkovich Spivak, Ulitsa Kosiora 56, kv. 55; Lazar Yankelevich Stanislavsky, Ulitsa Mayakovskogo 11, kv. 24; Vladimir Mordokheevich Rabinovich, prospekt Pravdy 7, kv. 186; Anatoly Kuzmich Levitsky, prospekt Frunze 46, kv. 27; Alexandr Ivanovich Kraschenko, Ulitsa Fesenkovskaya 12/14, kv. 4; Oleg Borisovich Gradov, Ulitsa Kosiora 6, kv. 1; and Evgeny Khalmovich Glider, Prospekt Ordzhonikidze 18, kv. 55, all of Kharkov, U.S.S.R.
Filed Dec. 17, 1968, Ser. No. 784,318
Int. Cl. H02k 5/00
U.S. Cl. 310—89                                2 Claims

ABSTRACT OF THE DISCLOSURE

An electrical machine has a stator comprising a middle portion and adjacent its ends horizontally split enclosures in which the front portions of the machine are disposed. The bearings of the machine are positioned in the end walls of the enclosures.

---

The present invention relates to electrical machines and more particularly to heavy-duty electrical machines.

Known in the art are electrical machines, turbogenerators in particular, the housings of which comprises the middle portion and the two removable end enclosures having a horizontal split and the supports on the longitudinal and cross beams of the foundation.

In the abovementioned machines, the bearings are placed either on a separate post with access to the front portions of the machine effected through the opening in the end wall covered by the shield or the bearings are mounted directly in the end shield.

The main disadvantage of the design of the electrical machine with the external bearings lies in an increased distance between the rotor supports. This intensifies characteristics vibration of the machine, the latter being of utmost importance for heavy-duty electrical machines. However, an advantage of such machines is that the bearing has direct connection with the foundation, thus increasing the rigidity of the support.

The main disadvantage of an electrical machine with the bearings built-in into the shields is the complicated design of the shield and the bearing as well as a decrease of the support's rigidity due to the absence of any direct connection of the bearing with the foundation.

It is a primary object of the present invention to eliminate the above-mentioned disadvantages.

The present invention is directed to the provision of a design of an electrical machine featuring improved vibration characteristics.

The above object is accomplished by a construction of an electrical machine, whose stator is the middle portion while adjacent to its ends horizontally split enclosures are adapted for housing of the front portions of the machine, the bearings, according to the invention, placed in the end walls of the enclosures.

The proposed electrical machine makes it feasible to simplify the design, to considerably increase rigidity of the supports for the bearings and to decrease the distance between the supports which considerably improves the vibration characteristics of the rotor; it also ensures rigid connection of the bearings with the foundation; it facilitates balancing of the rotor on its own bearings with the upper parts of the end enclosures of the stator removed and, finally, it makes it possible to insert and remove the rotor from the stator without dismantling the enclosures thereof.

The present invention may find wide application in heavy-duty electrical machines, in particular, turbogenerators.

The design of such electrical machines has been tested producing positive results and it was introduced in an 800-mw. turbogenerator as well as in a 1000-mw. load generator.

The present invention will be more apparent from the following description of an exemplary embodiment thereof, reference being made to the accompanying drawing the sole figure of which shows a longitudinal section of the electrical machine, according to the present invention.

As may be seen from the drawing, the proposed electrical machine has a stator comprising a middle portion 1 and two removable enclosures 2 and 3 resting on the longitudinal beams of the foundation 4 via supports 5 and on the cross beams of the foundation 4 via supports 6. The supports 6 extend laterally from enclosures 2 and 3 and are disposed in close proximity to the bearings 7. Such disposition of the supports 5 and 6 imparts an additional rigidity to the stator enclosures 2 and 3, and makes it possible to provide rigid connection of the bearing 7 with the foundation 4 and decrease the load on the beams of the foundation 4 thus increasing the vibration characteristics of the machine in question.

The enclosures 2 and 3 have a horizontal split passing through the main axis 8 of the machine owing to which the upper parts 9 of the enclosures can be dismantled.

Provision is made in the end walls 10 of the enclosures 2 and 3 for openings 11 where the bearings 7, seals 12 of the rotor shaft 13 and oil catchers 14 are positioned.

The possibility of dismantling of the upper parts 9 of the enclosures 2 and 3 permits free access to the front parts 15 of the stator winding and convenient access to the bearings 7 at the time of assembly and disassembly as well as facilitating balancing of the rotor on its own bearings due to free access to the balance loads of the rotor.

The size of the openings 11 where the bearings 7 are housed is sufficient to freely insert and remove the rotor without dismantling the enclosures 2 and 3. For this purpose it is sufficient to disassemble the bearings 7 along with oil seals 12 of the rotor shaft 13 and oil catchers 14.

What is claimed is:
1. An electrical machine having a high power rating and substantial axial length adapted for being supported on a foundation having longitudinal and cross beams, said machine comprising: a rotor; a stator enclosing the rotor and including a middle part and two end parts adjoining the middle part and constituted as enclosures with end walls; supports separately connecting the end parts to the foundation and bearing on the longitudinal beams of the foundation, said end parts of the stator being split in a horizontal plane; additional supports for said end parts by means of which said end parts bear on the cross beams of the foundation, and bearing means for said rotor installed in openings provided in respective end walls of said stator end parts, said additional supports being arranged directly under the bearing means, said openings in which the said bearing units are installed being of sufficient size to permit free introduction and extraction of the rotor without disassembly of the end parts of the stator.
2. A machine as claimed in claim 1 wherein said additional supports extend laterally from the end walls of the end parts and directly rest on the cross beams of the foundation.

(References on following page)

References Cited

UNITED STATES PATENTS

| | | | |
|---|---|---|---|
| 2,417,195 | 3/1947 | Hargreaves | 310—85UX |
| 2,488,458 | 11/1949 | Walton | 310—42UX |
| 2,804,559 | 8/1957 | Brewer | 310—89 |
| 3,053,390 | 9/1962 | Wood | 310—89X |
| 3,419,957 | 1/1969 | Stone | 310—42X |
| 3,437,853 | 4/1969 | Arnold | 310—89X |
| 3,445,698 | 5/1969 | Miko | 310—89X |

WARREN E. RAY, Primary Examiner

R. SKUDY, Assistant Examiner

U.S. Cl. X.R.

310—91